United States Patent Office 3,383,231
Patented May 14, 1968

3,383,231
PROCESS OF TREATING PIGMENTARY TiO$_2$
Benjamin W. Allan, Glendale, Calif., assignor to American Potash & Chemical Corporation, Los Angeles, Calif., a corporation of Delaware
No Drawing. Filed Mar. 20, 1964, Ser. No. 353,578
8 Claims. (Cl. 106—300)

ABSTRACT OF THE DISCLOSURE

A process for the production of titanium dioxide pigments having improved properties which includes the simultaneous addition to an aqueous titanium dioxide slurry, while maintaining the pH of the slurry continuously within the range of about 5–8, of additive metal salts to deposit hydroxides of at least two metals from the group consisting of aluminum, silicon, boron, titanium, antimony, zinc, magnesium, tin, lead and zirconium.

---

The present invention relates to the production of titanium dioxide pigments having improved properties. More particularly, it relates to the production, by a novel treating procedure, of titanium dioxide pigments improved in such manner that they may be incorporated directly into water base as well as oil base paints, plastics, floor coverings, and the like.

Specifically, paints, plastics, floor coverings and other items containing titanium dioxide pigments produced in accordance with this invention are improved by reason of having superior resistance to yellowing as well as to attack by light and weathering influences.

It has been discovered that such improved properties can be imparted to titanium dioxide pigments by operatively associating therewith, in accordance with the process of this invention, small amounts of co-precipitated mixtures of hydroxides (oxides or "plural-gels") of at least two metals selected from the group consisting of aluminum, silicon, boron, titanium, antimony, zinc, magnesium, tin, lead and zirconium. For convenience, the term "additive metals" will be used hereinafter to refer to these metals.

It has been determined that it is essential that at least two of the aforesaid additive metal hydroxides be co-precipitated in intimate association with the titanium dioxide pigment. Thus, the precipitation of only one of the additive metal hydroxides results in a composite titanium dioxide pigment having only limited resistance to attack by weather, chemical action, light and the like. On the other hand, co-precipitation of at least two additive metal hydroxides results in the production of a composite titanium dioxide pigment which when incorporated, for example, into enamel paints of both the baking and air drying types provides enamel films having superior tint retention, chemical stability, enhanced resistance to chalking and yellowing and films having excellent gloss retaining characteristics.

Broadly, the process of the present invention comprises contacting an aqueous slurry of titanium dioxide pigment with certain additive metal salts in such manner as to effect the co-precipitation of small amounts of hydroxides of at least two of the additive metals into intimate association with the titanium dioxide pigment.

More specifically, the process comprises co-precipitating small amounts of hydroxides of at least two of the additive metals into intimate association with a titanium dioxide pigment by the simultaneous introduction of an additive metal salt-precipitant system into an aqueous slurry of the pigment while continuously maintaining conditions in the resultant slurry-reaction mixture such that substantially all of the additive metals are precipitated in the form of their hydroxides.

In accordance with one preferred embodiment of this invention, the process is carried out by contacting an aqueous slurry of titanium dioxide pigment with (a) at least one acid salt of an additive metal and (b) at least one basic reacting compound to co-precipitate hydroxides of at least two of the additive metals while maintaining the slurry at a pH of from 3–9, preferably from about 5–8.

The acid metal salts which may be used in accordance with this embodiment of the invention include chlorides, chlorates, nitrites, nitrates, sulfates, bromides, bromates, iodides, iodates, acetates, lactates, sulfonates, tartrates, citrates, and the like of metals selected from the group consisting of aluminum, silicon, boron, titanium, antimony, zinc, magnesium, tin, lead and zirconium.

Examples of suitable basic reacting compounds which can be used conjointly with the acid metal salts include alkaline agents such as hydroxides, oxides, carbonates and bicarbonates of metals selected from the group consisting of alkali metals and alkaline earth metals. If desired, these particular basic compounds may be replaced, either wholly or in part, by one or more alkaline metal salts, examples of which include aluminates, silicates, borates, titanates, antimonates, zincates, stannates, plumbates and zirconates of metals selected from the group consisting of alkali metals and alkaline earth metals.

Since it is essential to the process that hydroxides of at least two of the above-indicated additive metals be co-precipitated in association with the titanium dioxide, the selection of particular basic reacting compounds necessarily is dependent upon the number of acid metal salts employed. Thus, if two or more acid metal salts are used, it is necessary to employ only one of the above-listed alkaline agents to achieve a co-precipitation of hydroxides of at least two of the aforesaid addittive metals. More than one alkaline agent and/or one or more of the alkaline metal salts also could be used, of course, although this is not necessary. On the other hand, if only one acid metal salt is used, it will be necessary to employ at least one alkaline metal salt (though two or more such salts and/or one or more of the alkaline agents also may be used) to make certain of the co-precipitation of the necessary hydroxides of at least two of the aforesaid additive metals.

In accordance with a second preferred embodiment of this invention, the process is carried out by contacting an aqueous titanium dioxide slurry with (a) at least one alkaline metal salt and (b) at least one acid reacting compound to co-precipitate hydroxides of at least two of the additive metals while maintaining the slurry at a pH of from 3–9, preferably from about 5–8.

When operating in this fashion, the alkaline metal salt again is, of course, any one or more from the group consisting of aluminates, silicates, borates, titanates, antimonates, zincates, stannates, plumbates and zirconates of the alkali metals and alkaline earth metals. The acid reacting compound can be one or more organic or inorganic acids such as hydrochloric acid, sulfuric acid, sulfonic acid, trichloroacetic acid, nitric acid, citric acid and the like.

If desired, the said organic and inorganic acids may be replaced, either wholly or in part, by one or more acid metal salts, examples of which again, of course, include chlorides, chlorates, nitrites, nitrates, sulfates, bromides, bromates, iodides, iodates, acetates, lactates, sulfonates, tartrates, citrates, and the like of metals selected from the group consisting of aluminum, silicon, boron, titanium, antimony, zinc, magnesium, tin, lead and zirconium.

Again, since it is essential to the process that hydroxides of at least two of the above-mentioned additive metals be co-precipitated in association with the titanium dioxide pigment, the selection of particular acid reaction compounds (in accordance with this second embodiment) is dependent upon the number of alkaline metal salts employed. Thus, if two or more alkaline metal salts are used, it is only necessary to use conjointly therewith one of said organic or inorganic acid. Also, of course, it is satisfactory under such circumstances to use more than one of these acids and/or one or more of the acid metal salts. If, on the other hand, only one alkaline metal salt is used, it will be necessary to use at least one acid metal salt. Additionally, of course, one or more organic or inorganic acids may be used, if desired.

It will be evident that when just one acid salt of an additive metal and one alkaline salt of an additive metal are used, stoichiometric quantities are required to achieve precipitation of substantially all of each metal in the form of its hydroxides. However, it is an important feature of this invention that varying quantities (different from the stoichiometric ratio) of metal hydroxides can be associated with the titanium dioxide pigment merely by adjusting the acidity and/or basicity of the desired reactant salts by suitable addition of the aforementioned organic or inorganic acids and bases.

When operating in accordance with either of the aforementioned embodiments of this invention, the aqueous slurry of titanium dioxide pigment may be maintained in a vessel or treatment tank of any suitable size provided with any convenient mixing means. The reactants, viz, the additive metal salts and precipitants therefore, are added to the slurry simultaneously through separate pipes or entrance means. It will be understood, of course, that the reactants may be pre-mixed with one another immediately prior to introduction and then introduced directly into the vessel containing the titanium dioxide pigment slurry.

It also is within the scope of this invention to practice the novel process hereof in what may be termed pipe line mixers. When operating in this manner, an aqueous slurry of titanium dioxide pigment is passed continuously through the pipe line mixer. Streams of the desired additive metal salts and precipitant are introduced continuously into the flowing stream of pigment slurry and co-precipitation of hydroxides of at least two of the desired additive metals occurs in association with the pigment as it flows continuously through the pipe line.

The aqueous suspension or slurry of titanium dioxide pigment treated in accordance with this invention, whether in a treatment tank or a pipe line mixer, preferably contains between about 200 and 500 g./l. of titanium dioxide. While the process of the invention is applicable to slurries containing less than 50 g./l. of titanium dioxide, it will be understood that such slurries are so dilute that handling of the same may prove difficult and not economical in certain commercial operations. Furthermore, while slurry concentrations of more than 1,000 g./l. are operative, it has been found to be relatively difficult to thoroughly agitate and uniformly associate the pigment with the precipitated metal hydroxides. The invention contemplates the utilization of titanium dioxide pigment which has been calcined or non-calcined, classified (air or hydro) or non-classified, flocculated or non-flocculated, etc.

The titanium dioxide pigment slurry is fed to the treatment or mixing tank continuously and at a substantially uniform rate. Simultaneously, liquid mixtures of the additive metal salts and precipitant are introduced into the mixing tank at separate points and at substantially constant rates.

The additive metal salts are added in amounts such that their hydroxide precipitants are associated with the titanium dioxide pigments in total amounts of from about 0.5% to 8% by weight, based on the total weight of the finished pigment. If less than 0.5% is present, the improved titanium dioxide pigment properties herein described are not obtained. More than 8% of the metal hydroxides may be associated with the pigment, if desired, although this merely adds to the cost of the finished pigment without affording any corresponding improvement in pigmentary properties.

It is essential, as indicated herein, that the hydroxides of at least two of the aforementioned additive metals be associated with the pigment. The choice of particular additive metal is not critical but of the total hydroxides precipitated each should be present in a quantity amounting to at least about 5% of the total precipitates.

It is essential that the additive metal salt and precipitant be added at a rate such that the pH of the resulting slurry-reaction mixture constantly is maintained within the range of about 3–9, preferably about 5–8. Under such conditions maximum association of hydrous metal oxides with the titanium dioxide pigment is effected. The process is carried out at temperatures ranging from about 30° to 90° C.

The resultant treated pigment slurry is withdrawn continuously at a substantially constant rate from the treatment tank and conveyed to a settling tank. The settled pigment slurry is withdrawn therefrom, filtered, washed free of soluble salts, dried and milled, after which it is ready for use.

In order to illustrate even more fully the advantages and capabilities of the present invention the following examples are set forth. Parts and percentages given are by weight unless otherwise indicated.

Example I

An aqueous slurry of calcined-hydroclassified titanium dioxide pigment containing about 300 g./l. of titanium dioxide is introduced continuously into a treatment tank. The slurry, as introduced into the tank, has a pH within the range of from about 9–11.

Simultaneously, separate streams of (a) a mixture of acid additive metal salts and (b) an alkaline reacting compound are introduced into the reaction tank. The metal salt stream contains about 150 g./l. of aluminum chloride and about 75 g./l. of titanium tetrachloride. The alkaline agent stream comprises one normal sodium hydroxide. The two streams are introduced into the slurry in the mixing tank at rates of flow such that the pH of the resultant slurry-reaction mixture is continuously maintained within the range of 6–8 and in quantities such that about 2.5% of aluminum oxide and about 0.5% of titanium oxide (both in the form of hydroxides) are associated with the titanium dioxide pigment.

The contents of the treatment tank are agitated thoroughly and continuously at a temperature of about 75° C. The resultant slurry-reaction mixture is withdrawn at a substantially constant rate. The withdrawn slurry is conveyed to a settling tank from which the settled slurry later is withdrawn, washed, filtered, and dried. The pigment thus produced, when incorporated in an oil drying paint, provides an enamel film having excellent weathering properties and improved resistance to attack by actinic light.

Example II

Simultaneously, separate streams of an acid metal salt and a basic reacting compound are introduced into a quantity of an aqueous slurry of titanium dioxide maintained in a reaction tank. The slurry contains about 200 g./l. of titanium dioxide. The acid metal salt stream contains about 150 g./l. of aluminum chloride. The basic stream contains about 200 g./l. of sodium silicate. The two streams are introduced, at about 50° C., into the titanium dioxide pigment slurry in the tank at rates of flow such that the pH of the slurry-reaction mixture is continuously maintained in the range of 5–8. The aluminum chloride and sodium silicate solutions are added in quantities so as to associate with the $TiO_2$ pigment about 1% of aluminum oxide and about 1.5% of silicon dioxide, in the form of the hydroxides. The pigment thus treated, after washing and drying, is suitable for incorporation in plastics which exhibit excellent resistance to yellowing.

Example III

Separate streams of (a) alkaline metal salts and (b) an acidic reacting compound are introduced continuously into a reaction tank containing a constantly agitated aqueous slurry of titanium dioxide pigment (about 450 g./l., $TiO_2$). The alkaline metal salt streams comprise one containing about 200 g./l. sodium silicate and another containing about 100 g./l. soduim aluminate. The third, or acid, steam contains about 150 g./l. hydrochloric acid. The three streams are added simultaneously into the slurry at rates of flow such that the pH of the slurry-reaction mixture is continuously maintained within the range of 5-8. The reactants are introduced in quantities such that about 1% aluminum oxide and about 2% silicon dioxide become associated with the $TiO_2$ pigment, in the form of hydroxides. When washed, dried and milled, this pigment is adapted particularly for incorporation into an air-drying paint which provides films resistant to attack by light.

Example IV

A stream containing acid metal salts and a stream comprising a basic reacting compound are introduced continuously into a reaction tank into which there also is introduced continuously an aqueous slurry stream containing about 150 g./l. of titanium dioxide. The acid metal salt stream is a proportioned mixture made from solutions containing about 150 g./l. of aluminum chloride, about 100 g./l. of titanium tetrachloride, and about 50 g./l. of zinc chloride. The alkaline stream contains about 100 g./l. of sodium carbonate. These two streams and the pigment stream are introduced continuously into the mixing tank at rates of flow such that the pH of the resultant slurry-reaction mixture is continuously maintained within the range of 5-8. Quantities of the acid metal salt solution are added so as to associate with the $TiO_2$ pigment about 2% aluminum oxide, about 0.5% titanium dioxide, and about 0.25% zinc oxide, in the form of their hydroxides. Pigment thus prepared is particularly suitable for use in the manufacture of plastics.

Example V

Simultaneously, separate streams of a mixture of alkaline metal salts and an acid reacting compound are introduced into a reaction tank. The alkaline metal salt solution is a proportioned mixture made from solutions containing about 150 g./l. of sodium silicate and 100 g./l. of sodium aluminate. The acid reacting stream contains about 150 g./l. of titanium tetrachloride plus hydrochloric acid having a concentration of about 50 g./l. The two streams are introduced into the slurry in the mixing tank at rates of flow such that the pH of the resultant slurry-reaction mixture is continuously maintained within the range of 5-8. Quantities of reactants are added so as to associate with the $TiO_2$ pigment about 4% silicon dioxide, about 1.5% aluminum oxide, and about 0.25% titanium dioxide, all in the form of their hydroxides. This pigment is suitable for incorporation into oil-base paints intended for outdoor use.

Example VI

A stream of acid metal salts and a separate stream of basic reacting compounds are introduced simultaneously into a reaction tank containing a titanium dioxide slurry (500 g./l., $TiO_2$). The acid metal salt stream is a proportioned mixture made from solutions containing about 100 g./l. of titanium tetrachloride and about 75 g./l. of magnesium chloride. The basic reacting stream contains about 150 g./l. of sodium aluminate plus about 25 g./l. of sodium hydroxide. The two streams are introduced into the slurry in the mixing tank at rates of flow such that the pH of the slurry-reaction mixture is continuously maintained in the range of 5-8. Quantities of the reactants are added so as to associate with the $TiO_2$ pigment about 0.25% magnesium oxide, about 2% aluminum oxide, and about 0.25% titanium oxide, in the form of their hydroxides.

Example VII

An aqueous slurry of titanium dioxide having a solids concentration of about 300 g./l. is passed continuously through a pipe line mixer. Simultaneously, separate streams of a mixture of alkaline metal salts and of acid reacting compounds are introduced into the slurry while it passes through the pipe line. The alkaline metal reactant stream is a proportioned mixture made from solutions containing about 100 g./l. of sodium silicate and about 75 g./l. of sodium aluminate. The acid reacting stream is a proportioned mixture made from solutions containing about 50 g./l. of magnesium sulfate, 100 g./l. of titanium sulfate plus sulfuric acid having a concentration of about 50 g./l. The two streams are introduced continuously into the constantly flowing slurry of titanium dioxide at rates such that the pH of the formed slurry-reaction mixture is continuously maintained within the range of 6-8. Quantities of the reactants are added so that there becomes associated with the $TiO_2$ pigment about 2% silicon dioxide, about 1% aluminum dioxide, about 0.01% magnesium oxide, and about 0.25% titanium oxide, all in the form of their hydroxides. The resultant pigment is washed, dried and sent to a packaging station. It is suitable for incorporation in plastics.

The process of this invention is applicable to the improvement of titanium dioxide pigments produced by either the sulfate process, wherein the pigment is produced by the hydrolysis of solutions of titanium sulfate, or the chloride process, wherein the pigment is formed by the vapor phase reaction of a titanium halide and an oxygen-containing gas.

While the invention has been described with respect to certain preferred embodiments, it should be understood, of course, that certain changes, substitutions, modifications and the like may be made without departing from its true scope.

What is claimed is:

1. A process which consists essentially of introducing into a slurry of pigmentary titanium dioxide simultaneously and separately streams of
    (a) at least one acid salt of a metal selected from the group consisting of aluminum, silicon, boron, titanium, antimony, zinc, magnesium, tin, lead and zirconium and
    (b) at least one compound selected from the groups consisting of:
        (i) hydroxides, oxides, carbonates and bicarbonates of alkali metals and alkaline earth metals
        (ii) aluminates, silicates, borates, titanates, antimonates, zincates, stannates, plumbates and zirconates of alkali metals and alkaline earth metals
            provided that when at least two compounds are selected from (a) only one compound need be selected from (b) and that when only one compound is selected from (a) there must be at least one compound selected from (ii)

said streams being introduced in amounts sufficient to coprecipitate from about 0.5% to about 8%, by weight, based on the total weight of the finished titanium dioxide pigment, hydroxides of at least two metals selected from the group consisting of aluminum, silicon, boron, titanium, antimony, zinc, magnesium, tin, lead and zirconium into association with said pigmentary titanium dioxide, each of said hydroxide precipitates amounting to at least 5% by weight of the total precipitates, the rate of introduction of said streams being controlled to maintain the resultant slurry at a pH of about 5-8 throughout said introduction, drying the slurry to remove water therefrom, and then milling the dried pigment to produce a finished titanium dioxide pigment product.

2. A process which consists essentially of introducing into a continuously flowing slurry of pigmentary titanium dioxide simultaneously and separately streams of
(a) at least one acid salt of a metal selected from the group consisting of aluminum, silicon, boron, titanium, antimony, zinc, magnesium, tin, lead and zirconium and
(b) at least one compound selected from the groups consisting of:
(i) hydroxides, oxides, carbonates and bicarbonates of alkali metals and alkaline earth metals
(ii) aluminates, silicates, borates, titanates, antimonates, zincates, stannates, plumbates and zirconates of alkali metals and alkaline earth metals
provided that when at least two compounds are selected from (a) only one compound need be selected from (b) and that when only one compound is selected from (a) there must be at least one compound selected from (ii)
said streams being introduced in amounts sufficient to coprecipitate from about 0.5% to about 8%, by weight, based on the total weight of the finished titanium dioxide pigment, hydroxides of at least two metals selected from the group consisting of aluminum, silicon, boron, titanium, antimony, zinc, magnesium, tin, lead, and zirconium into association with said pigmentary titanium dioxide, each of said hydroxide precipitates amounting to at least 5% by weight of the total precipitates, the rate of introduction of said streams being controlled to maintain the resultant slurry at a pH of about 5–8 throughout said introduction, drying the slurry to remove water therefrom, and then milling the dried pigment to produce a finished titanium dioxide pigment product.

3. A process which consists essentially of introducing, into a slurry of pigmentary titanium dioxide, in the form of a single stream the admixture resulting from the pre-mixing of
(a) at least one acid salt of a metal selected from the group consisting of aluminum, silicon, boron, titanium, antimony, zinc, magnesium, tin, lead and zirconium and
(b) at least one compound selected from the groups consisting of:
(i) hydroxides, oxides, carbonates and bicarbonates of alkali metals and alkaline earth metals
(ii) aluminates, silicates, borates, titanates, antimonates, zincates, stannates, plumbates and zirconates of alkali metals and alkaline earth metals
provided that when at least two compounds are selected from (a) only one compound need be selected from (b) and that when only one compound is selected from (a) there must be at least one compound selected from (ii)
the ingredients employed in said pre-mixing being present in amounts sufficient to co-precipitate from about 0.5% to about 8% by weight, based on the total weight of the finished titanium dioxide pigments, hydroxides of at least two metals selected from the group consisting of aluminum, silicon, boron, titanium, antimony, zinc, magnesium, tin, lead and zirconium into association with said pigmentary titanium dioxide, each of said hydroxide precipitates amounting to at least 5% by weight of the total precipitates, the rate of introduction of said single stream being controlled to maintain the resultant slurry at a pH of about 5–8 throughout said introduction, drying the slurry to remove water therefrom, and then milling the dried pigment to produce a finished titanium dioxide pigment product.

4. A process which consists essentially of continuously introducing into a continuously flowing slurry of pigmentary titanium dioxide, in the form of a continuously flowing single stream the admixture resulting from the pre-mixing of
(a) at least one acid salt of a metal selected from the group consisting of aluminum, silicon, boron, titanium, antimony, zinc, magnesium, tin, lead and zirconium and
(b) at least one compound selected from the groups consisting of:
(i) hydroxides, oxides, carbonates and bicarbonates of alkali metals and alkaline earth metals
(ii) aluminates, silicates, borates, titanates, antimonates, zincates, stannates, plumbates and zirconates of alkali metals and alkaline earth metals
provided that when at least two compounds are selected from (a) only one compound need be selected from (b) and that when only one compound is selected from (a) there must be at least one compound selected from (ii)
the ingredients employed in said pre-mixing being present in amounts sufficient to co-precipitate from about 0.5% to about 8% by weight, based on the total weight of the finished titanium dioxide pigment, hydroxides of at least two metals selected from the group consisting of aluminum, silicon, boron, titanium, antimony, zinc, magnesium, tin, lead and zirconium into association with said pigmentary titanium dioxide, each of said hydroxide precipitates amounting to at least 5% by weight of the total precipitates, the rate of introduction of said single stream being controlled to maintain the resultant slurry at a pH of about 5–8 throughout said introduction, drying the slurry to remove water therefrom, and then milling the dried pigment to produce a finished titanium dioxide pigment product.

5. A process which consists essentially of introducing into a slurry of pigmentary titanium dioxide simultaneously and separately streams of
(a) at least one alkaline salt of a metal selected from the group consisting of alkali metal and alkaline earth metal aluminates, silicates, borates, titanates antimonates, zincates, stannates, plumbates and zirconates and
(b) at least one acid reacting compound selected from the groups consisting of:
(i) organic acids and inorganic acids
(ii) acid salts of metals selected from the group consisting of aluminum, silicon, boron, titanium, antimony, zinc, magnesium, tin, lead and zirconium
provided that when at least two compounds are selected from (a) only one compound need be selected from (b) and that when only one compound is selected from (a) there must be at least one compound selected from (ii)
said streams being introduced in amounts sufficient to co-precipitate from about 0.5% to about 8%, by weight, based on the total weight of the finished titanium dioxide pigment, hydroxides of at least two metals selected from the group consisting of aluminum, silicon, boron, titanium, antimony, zinc, magnesium, tin, lead and zirconium into association with said pigmentary titanium dioxide, each of said hydroxide precipitates amounting to at least 5% by weight of the total precipitates, the rate of introduction of said streams being controlled to maintain the resultant slurry at a pH of about 5–8 throughout said introduction, drying the slurry to remove water therefrom, and then milling the dried pigment to produce a finished titanium dioxide pigment product.

6. A process which consists essentially of continuously introducing into a continuously flowing slurry of pigmentary titanium dioxide simultaneously and separately streams of
(a) at least one alkaline salt of a metal selected from the group consisting of alkali metal and alkaline earth metal aluminates, silicates, borates, titanates, antimonates, zincates, stannates, plumbates and zirconates and
(b) at least one acid reacting compound selected from the groups consisting of:
   (i) organic acids and inorganic acids
   (ii) acid salts of metals selected from the group consisting of aluminum, silicon, boron, titanium, antimony, zinc, magnesium, tin, lead and zirconium
     provided that when at least two compounds are selected from (a) only one compound need be selected from (b) and that when only one compound is selected from (a) there must be at least one compound selected from (ii)

said streams being introduced in amounts sufficient to co-precipitate from about 0.5% to about 8%, by weight, based on the total weight of the finished titanium dioxide pigment, hydroxides of at least two metals selected from the group consisting of aluminum, silicon, boron, titanium, antimony, zinc, magnesium, tin, lead and zirconium into association with said pigmentary titanium dioxide, each of said hydroxide precipitates amounting to at least 5% by weight of the total precipitates, the rate of introduction of said streams being controlled to maintain the resultant slurry at a pH of about 5–8 throughout said introduction, drying the slurry to remove water therefrom, and then milling the dried pigment to produce a finished titanium dioxide pigment product.

7. A process which consists essentially of introducing, into a slurry of pigmentary titanium dioxide, in the form of a single stream the admixture resulting from the pre-mixing of
(a) at least one alkaline salt of a metal selected from the group consisting of alkali metal and alkaline earth metal aluminates, silicates, borates, titanates, antimonates, zincates, stannates, plumbates and zirconates and
(b) at least one acid reacting compound selected from the groups consisting of:
   (i) organic acids and inorganic acids
   (ii) acid salts of metals selected from the group consisting of aluminum, silicon, boron, titanium, antimony, zinc, magnesium, tin, lead and zirconium
     provided that when at least two compounds are selected from (a) only one compound need be selected from (b) and that when only one compound is selected from (a) there must be at least one compound selected from (ii)

the ingredients employed in said pre-mixing being present in amounts sufficient to co-precipitate from about 0.5% to about 8%, by weight, based on the total weight of the finished titanium dioxide pigments, hydroxides of at least two metals selected from the group consisting of aluminum, silicon, boron, titanium, antimony, zinc, magnesium, tin, lead and zirconium in association with said pigmentary titanium dioxide, each of said hydroxide precipitates amounting to at least 5% by weight of the total precipitates, the rate of introduction of said single stream being controlled to maintain the resultant slurry at a pH of about 5–8 throughout said introduction, drying the slurry to remove water therefrom, and then milling the dried pigment to produce a finished titanium dioxide pigment product.

8. A process which consists essentially of continuously introducing into a continuously flowing slurry of pigmentary titanium dioxide, in the form of a continuously flowing single stream the admixture resulting from the pre-mixing of
(a) at least one alkaline salt of a metal selected from the group consisting of alkali metal and alkaline earth metal aluminates, silicates, borates, titanates, antimonates, zincates, stannates, plumbates and zirconates and
(b) at least one acid reacting compound selected from the groups consisting of:
   (i) organic acids and inorganic acids
   (ii) acid salts of metals selected from the group consisting of aluminum, silicon, boron, titanium, antimony, zinc, magnesium, tin, lead and zirconium
     provided that when at least two compounds are selected from (a) only one compound need be selected from (b) and that when only one compound is selected from (a) there must be at least one compound selected from (ii)

the ingredients employed in said pre-mixing being present in amounts sufficient to co-precipitate from about 0.5% to about 8%, by weight, based on the total weight of the finished titanium dioxide pigment, hydroxides of at least two metals selected from the group consisting of aluminum, silicon, boron, titanium, antimony, zinc, magnesium, tin, lead ad zirconium into association with said pigmentary titanium dioxide, each of said hydroxide precipitates amounting to at least 5% by weight of the total precipitates, the rate of introduction of said single stream being controlled to maintain the resultant slurry at a pH of about 5–8 throughout said introduction, drying the slurry to remove the water therefrom, and then milling the dried pigment to produce a finished titanium dioxide pigment product.

References Cited

UNITED STATES PATENTS

| | | | |
|---|---|---|---|
| 2,284,772 | 6/1942 | Seidel | 106—300 |
| 2,297,523 | 9/1942 | Allan et al. | 106—300 |
| 2,387,534 | 10/1945 | Seidel | 106—300 |
| 2,671,031 | 3/1954 | Whately | 106—300 |
| 3,035,966 | 5/1962 | Siuta | 106—300 |
| 3,146,119 | 8/1964 | Ritter | 106—308 |
| 3,203,818 | 8/1965 | Rechmann et al. | 106—300 |
| 3,220,867 | 11/1965 | O'Shaughnessy | 106—300 |
| 3,251,705 | 5/1966 | Rieck et al. | 106—300 |

TOBIAS E. LEVOW, *Primary Examiner.*

S. E. MOTT, *Assistant Examiner.*